3,275,460
MOLD DRESSINGS FOR USE IN FOUNDRY PRACTICE

Jean Louis Jeanneret, Berea, Ohio, assignor to Foseco International Limited, Birmingham, England
No Drawing. Filed Nov. 23, 1964, Ser. No. 413,291
17 Claims. (Cl. 106—38.22)

This application is a continuation-in-part of my copending application, Serial No. 124,379 entitled, "Mold Dressings for Use in Foundry Practice," filed July 17, 1961, now abandoned.

This invention relates to mold dressings for use in foundry practice. More particularly, this invention relates to mold dressings of the type comprising a suspension of fine particles, usually of a refractory nature such as silica flour, zirconia or the like, in a liquid carrier together with a suitable bonding agent, which dressing is applied as a smooth coating on a mold or core surface to produce an improved surface finish on the cast metal.

The dressing may include various ingredients suspended or dissolved in the liquid carrier, depending on the individual type of mold or core being coated and the type of metal being cast. Such dressings, being liquids, are conveniently applied by spraying, brushing, or dipping and are then dried to produce a smooth coating.

One object of the present invention is to provide an improved liquid mold dressing of the above character which is highly stable against sedimentation and packing of particles suspended therein.

Another object of the present invention is to provide an improved liquid mold dressing composition of the above type which, when applied as a coating to mold and core surfaces, is resistant to cracking during drying even when thick coatings are applied.

A further object of the invention is to provide an improved mold dressing composition of the foregoing character which gels readily when required, and which is resistant to precipitation or separation of the gel.

Still another object of the invention is to provide an improved mold dressing composition having the foregoing characteristics which is inexpensive, has a maximum shelf life, and is readily applied as a coating to mold or core surfaces.

Other objects and advantages of the present invention will become apparent as the following description proceeds. It should be understood that there is no intention to limit the invention to the specific embodiments disclosed. On the contrary, the intention is to cover all modifications, alternatives, equivalents, and uses falling within the spirit and scope of the invention as expressed in the appended claims.

The mold dressing compositions embodying the present invention consist essentially of a suspension of finely divided refractory material in an aqueous medium which includes, as a suspension agent, a highly refined guar gum characterized by a Brookfield viscosity in a 1% by weight aqueous solution at 74° F. with a No. 4 spindle at 6 r.p.m. of about 22,500 centipoises and at 60 r.p.m. of about 4,800 centipoises.

It has been found that the particular guar gum which is employed as a suspension agent in accordance with this invention produces mold dressing compositions which are vastly superior not only to mold dressing compositions employing other polysaccharide suspension agents, but also to mold dressing compositions employing ordinary guar gums as suspension agents. Thus, in a series of tests conducted to compare the performance of the compositions of this invention with various other compositions, different polysaccharide suspension agents were dissolved in water in several different degrees of concentration, and each of these solutions was mixed with an equal amount of silica flour to form a suspension of silica flour and water. Each suspension was then placed in a settling tube, and periodic tests were made to determine the amount of free liquid at the top of the tube and the amount of sediment at the bottom of the tube. The results of these tests are given in the following table:

SEDIMENTATION TESTS WITH POLYSACCHARIDES

| Polysaccharide Amount Added, Percent | Time | Composition A | | Composition B | | Composition C | | Composition of Present Invention | |
|---|---|---|---|---|---|---|---|---|---|
| | | Compaction | Free Liquid, Percent | Compaction | Free Liquid, Percent | Compaction | Free Liquid, Percent | Compaction | Free Liquid, Percent |
| 0.5 | 1 hr | | 3 | 20% | 3 | | 46 | | 0 |
| | 4 hr | | 15 | 32%(H) 38%(S) | | 46%(S) | | | 0 |
| | 24 hr | 75%(S) | | 50%(H) | | 50%(H) | | 5%(S) | 0 |
| 1.0 | 1 hr | | 0 | | 4 | 10%(S) | | | 0 |
| | 4 hr | | 1 | 6%(H) | 15 | 20%(S) | | | 0 |
| | 18 hr | | 4 | 40%(H) | 40 | 40%(H) | 40 | | 0 |
| | 48 hr | 4%(S) | 6 | 40%(H) | 40 | 40%(H) | | | 0 |
| 1.5 | 1 hr | | 0 | | 4 | 12%(S) | | | 0 |
| | 4 hr | | 2 | 8%(S) | 4 | 25%(S) | 20 | | 0 |
| | 18 hr | Trace | 4 | 40%(S) | 40 | 40%(S) | 40 | | 0 |
| | 48 hr | 4%(H) | 4 | 40%(H) | 40 | 40%(H) | 40 | | 0 |

KEY:
 (S)=Soft compaction.
 (H)=Hard compaction.

The suspension agent employed in composition A in the above table was powdered gum tragacanth U.S.P.S. grade, which is commercially available from Morningstar-Paisley, Inc. In composition B, the suspension agent was a mixture of guar gum and pre-gelatinized potato starch which is sold commercially under the trade name "Starguar H" by Morningstar-Paisley, Inc. The suspension in composition C was a mixture of karaya gum and pre-gelatinized potato starch sold under the trade name "Hamaco" by Morningstar-Paisley, Inc. In the composition of the present invention, the suspension agent was a highly refined guar gum of the type described above, i.e., characterized by a Brookfield viscosity in a 1% by weight aqueous solution at 74° F. with a No. 4 spindle at 6 r.p.m. of about 22,500 centipoises and at 60 r.p.m. of about 4,800 centipoises. One example of such a guar gum is the material sold by The Burtonite Company under the trade name "Burtonite V7E," which was the material actually employed in the above example.

As can be seen from the data in the above table, the mold dressing compositions A, B, and C always exhibited a substantial amount of free liquid and compaction after standing for just a few hours, especially at the lower concentration. Indeed, in the samples containing 0.5% suspension agents, the smallest amount of free liquid in any of these three compositions after only one hour of standing was 3%. Moreover, after 24 hours of standing, each of the three 0.5% samples exhibited at least 50% compaction. At this same concentration (0.5%), the mold dressing composition of the present invention exhibited no free liquid whatever and only 5% of soft compaction, even after 24 hours of standing.

The superiority of the inventive compositions as demonstrated by the above data is extremely important in any practical application. For example, because of the low compaction and absence of free liquid, the mold dressing compositions of this invention are highly resistant to cracking during drying on the mold wall, even when relatively thick coatings are applied. These compositions also prevent precipitation or separation of the gel on the mold wall. Moreover, the compositions are inexpensive, have a relatively long shelf life, and are easy to apply as coatings to the mold or core surfaces. As mentioned above, one example of the particular guar gum employed in this invention is the material sold under the trade name "Burtonite V7E" by The Burtonite Company. This guar gum is made by milling pale guar seed (as opposed to dark guar seed) while frozen, and subsequently dehydrating the resulting product. The dehydrated gum contains a maximum of 0.75% protein as cellulose, 0.5% fat, 1.0% ash, and 12.5% moisture. The pH of an aqueous solution of this particular guar gum is 6.6 at 74° F. It is generally preferred to use only minor amounts of the described guar gum in the mold dressing composition of this invention, and amounts in the range of about 0.05% to 1.5% by weight are satisfactory for most applications.

The finely divided refractory material generally comprises about 40 to 80 weight percent of the mold dressing compositions, and many be any of the conventional finely divided refractories, such as silica flour, chromite flour, diatomaceous earth, graphite, coke, or fine sands of such materials. The flours are preferably −200 mesh or finer, and the sands are preferably at least −60 mesh. The aqueous medium used to form the suspension may be water alone or various aqueous mixtures, such as alcohol and water or sodium silicate and water for example.

In addition to the refractory material and the aqueous medium, the mold dressing compositions of this invention may include a small amount of binder such as sulphite lye, dextrin, gum arabic, or a water soluble synthetic resin. In this connection, it has been discovered that the subject mold dressing compositions are substantially unaffected by the presence of electrolytes, for example the troublesome cations, such as calcium, which are present in sulphite lye binder, used in the dressing. Moreover, the compositions have also been found to be unaffected by changes in the pH of the solution.

The viscosity of the guar gum solution used in the mold dressing compositions may be increased by the addition of a small quantity of borax which also clarifies the gel, and in this way the quantity of guar gum can be reduced with consequent saving. In order to prevent packing of the solid particles upon prolonged standing of the mold dressing composition, the composition may also include a small portion of bentonite (usually less than 1%) or other clay of high gelling power. Alternatively, ball clays or china clays may be used in higher percentages. The bentonite or other clay is flocculated by a very small quantity (0.25% or less) of the guar gum, and the floccules effectively prevent packing of the solid particles.

A small amount of fungicide may also be added to the composition. For example, one suitable fungicide is Dow Chemical Company's "Dowicied A," which is a phenyl-phenol-sodium tetrahydrate having the general chemical formula $C_6H_4(C_6H_5)ONa4H_2O$. Many other suitable fungicides are commercially available and are well known to those familiar with the art.

It is convenient in practice to set up the composition in concentrated form, e.g., as pastes, gels or powders, which will be diluted and blended as necessary for use. Thus, the following are suitable concentrations according to the invention:

Concentrated paste:

| | Percent |
|---|---|
| Refractory powder | 40–80 |
| Water | 15–50 |
| Bentonite | 0–3 |
| Fungicide | 0.01–1 |
| Binder | 1–10 |
| Guar gum having a Brookfield viscosity in a 1% by weight aqueous solution at 74° F. with a No. 4 spindle at 6 r.p.m. of about 22,500 centipoises and at 60 r.p.m. of about 4,800 centipoises | 0.05–1.5 |

Concentrated gel:

| | |
|---|---|
| Wetting agent (low foaming) | 0.25–2 |
| Bentonite | 1 |
| Fungicide | 0.25 |
| Binder | 2 |
| Guar gum having a Brookfield viscosity in a 1% by weight aqueous solution at 74° F. with a No. 4 spindle at 6 r.p.m. of about 22,500 centipoises and at 60 r.p.m. of about 4,800 centipoises | 0.25–4.0 |
| Water | Balance |

In casting heavy sections, about 7.5% of the above gel may be blended with 21% water and 71.5% refractory powder. In casting light sections, about 1.5% of the gel may be blended with 30.5% water and 68% refractory powder.

Any suitable wetting agent, such as the commercially available dialkyl sulfosuccinates, may be used in the gel formulation.

Powder:

| | Percent |
|---|---|
| Refractory powder | 50–98 |
| Bentonite | 0–3 |
| Fungicide | 0.01–1 |
| Binder | 1–10 |
| Guar gum having a Brookfield viscosity in a 1% by weight aqueous solution at 74° F. with a No. 4 spindle at 6 r.p.m. of about 22,500 centipoises and at 60 r.p.m. of about 4,800 centipoises | 0.1–2 |

If desired, the refractory powder may be omitted from the initial powder mixture to reduce the shipping weight and volume, and then added along with the water when the mixture is eventually diluted to form the desired wash. This type of powder, i.e., without the refractory, may be termed a "powdered gel."

The following examples will serve to illustrate the invention:

*Example 1*

A paste of the following composition:

| | Percent |
|---|---|
| Zircon flour (−240 mesh) | 78 |
| Sulphite lye | 2 |
| Fungicide | 0.25 |
| Water, balance to | 100 |
| Guar gum having a Brookfield viscosity in a 1% by weight aqueous solution at 74° F. with a No. 4 spindle at 6 r.p.m. of about 22,500 centipoises and at 60 r.p.m. of about 4,800 centipoises | 0.4 | was diluted to a density of 58° Baumé and sprayed on the sand molds to give a coating of 0.5 mm. in thickness, which is sufficient to stand up to high ferrostatic pressure.

The dried mold had a good finish and, most important, no cracking or peeling of the wash occurred.

A steel casting cast in the mold coated with this wash exhibited excellent surface finish. A wash of similar composition, but containing bentonite as the suspension agent, had to be applied at 65° Baumé to give the same coating thickness and the coating cracked on drying.

*Example II*

A paste of the following composition was prepared:

| | Percent |
|---|---|
| Silica flour (−200 mesh) | 74.5 |
| Graphite | 21 |
| Sulphite lye | 3 |
| Fungicide | 0.25 |
| Bentonite (western) | 0.65 |
| Guar gum having a Brookfield viscosity in a 1% by weight aqueous solution at 74° F. with a No. 4 spindle at 6 r.p.m. of about 22,500 centipoises and at 60 r.p.m. of about 4,800 centipoises | 0.6 |

This paste when diluted to 32° Baumé had good suspension properties and gave excellent surface finishes on flame torched molds used in the manufacture of diesel engine blocks. It was further found that in instances where, for economic reasons only, a very thin coating was desired, hard settling at dilutions of 24–26° Baumé could be prevented by the addition of 1% of an acetate salt of an aliphatic amine, for example, the acetate salt of a mixture of primary amines containing $C_{18}$—84% (76% oleyl, 3% linoleyl, 5% octadecyl), $C_{12}$—0.5%, $C_{14}$—3.5%, $C_{15}$—0.5%, $C_{16}$—4.0%, $C_{17}$—1.0%, $C_{14\,unsaturated}$—1.5%, $C_{16\,unsaturated}$—5.0% one of many similar compositions available commercially under the trade name "Armac" from Armour and Co. In order to prevent foaming, a small amount of a foam depressor, such as 0.25% oleyl alcohol, is added to the composition.

I claim as my invention:

1. A mold dressing composition consisting essentially of a suspension of about 40 to 80% by weight of finely divided refractory material in an aqueous medium which includes, as a suspension agent, about 0.05 to about 1.5% by weight of a highly refined guar gum characterized by a Brookfield viscosity in 1% by weight aqueous solution at 74° F. with a No. 4 spindle at 6 r.p.m. of about 22,500 centipoises and at 60 r.p.m. of about 4,800 centipoises.

2. A mold dressing composiiton as defined in claim 1 which contains up to about 1% by weight bentonite.

3. A mold dressing composition as defined in claim 1 which includes a fungicide.

4. A mold dressing composition as defined in claim 1 which includes a binder material.

5. A method of dressing a mold for metal casting which comprises applying to the inner surface of the mold a composition consisting essentially of a suspension of about 40 to 80% by weight of finely divided refractory material in an aqueous medium which includes, as a suspension agent, about 0.05 to about 1.5% by weight of a highly refined guar gum characterized by a Brookfield viscosity in a 1% by weight aqueous solution at 74° F. with a No. 4 spindle at 6 r.p.m. of about 22,500 centipoises and at 60 r.p.m. of about 4,800 centipoises.

6. A method as defined in claim 5 in which said composition includes up to about 1% by weight bentonite.

7. A method as defined in claim 5 in which said composition includes a fungicide.

8. A method as defined in claim 5 in which said composition includes a binder material.

9. A powder for use in forming a mold dressing composition, said powder consisting essentially of about 50 to 98% by weight of finely divided refractory material and about 0.1 to 2% by weight of a suspension agent consisting of a highly refined guar gum characterized by a Brookfield viscosity in a 1% by weight aqueous solution at 74° F. with a No. 4 spindle at 6 r.p.m. of about 22,500 centipoises and at 60 r.p.m. of about 4,800 centipoises.

10. A powder as defined in claim 9 which contains up to about 3% by weight bentonite.

11. A powder as defined in claim 9 which includes a fungicide.

12. A powder as defined in claim 9 which includes a binder material.

13. A gel for use in a mold dressing composition, said gel consisting essentially of to about 2% by weight of a binder material and about 0.25 to 4.0% by weight of a highly refined guar gum in an aqueous medium, said highly refined guar gum being characterized by a Brookfield viscosity in a 1% by weight aqueous solution at 74° F. with a No. 4 spindle at 6 r.p.m. of about 22,500 centipoises and at 60 r.p.m. of about 4,800 centipoises.

14. A gel as defined in claim 13 which contains up to about 1% by weight bentonite.

15. A gel as defined in claim 13 which includes a fungicide.

16. A gel as defined in claim 13 which includes a wetting agent.

17. A mold dressing composition consisting essentially of a suspension of about 40 to 80% by weight of a finely divided refractory material selected from the group consisting of silica flour, chromite flour, diatomaceous earth, graphite and coke in an aqueous medium which includes, as a suspension agent, abuot 0.05 to about 1.5% by weight of a highly refined guar gum characterized by a Brookfield viscosity in a 1% by weight aqueous solution at 74° F. with a No. 4 spindle at 6 r.p.m. of about 22,500 centipoises and at 60 r.p.m. of about 4,800 centipoises.

References Cited by the Examiner

UNITED STATES PATENTS

| 2,524,739 | 10/1950 | Stone | 106—209 |
| 2,949,397 | 8/1960 | Werner et al. | 106—209 |
| 3,146,113 | 8/1964 | Middleton et al. | 106—38.23 |
| 3,146,200 | 8/1964 | Goldstein et al. | 106—208 |

FOREIGN PATENTS

| 765,337 | 1/1957 | Great Britain. |

ALEXANDER H. BRODMERKEL, *Primary Examiner.*

L. HAYES, *Assistant Examiner.*